United States Patent
Drzewiecki et al.

(10) Patent No.: US 9,542,112 B2
(45) Date of Patent: Jan. 10, 2017

(54) SECURE CROSS-PROCESS MEMORY SHARING

(71) Applicant: VMware, Inc., Palo Alto, CA (US)

(72) Inventors: Adrian Drzewiecki, Mountain View, CA (US); Christoph Klee, Snoqualmie, WA (US); Mounesh Badiger, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/686,527

(22) Filed: Apr. 14, 2015

(65) Prior Publication Data

US 2016/0306578 A1    Oct. 20, 2016

(51) Int. Cl.
  *G06F 12/14*    (2006.01)
  *G06F 3/06*    (2006.01)
  *G06F 13/16*    (2006.01)

(52) U.S. Cl.
  CPC ........... *G06F 3/0622* (2013.01); *G06F 3/0637* (2013.01); *G06F 3/0659* (2013.01); *G06F 3/0673* (2013.01); *G06F 12/1416* (2013.01); *G06F 13/1663* (2013.01); *G06F 12/14* (2013.01)

(58) Field of Classification Search
  CPC .. G06F 12/14; G06F 12/1441; G06F 12/1416; G06F 13/1663
  USPC .................................................... 711/147, 163
  See application file for complete search history.

(56) References Cited

U.S. PATENT DOCUMENTS

| 2002/0032844 A1* | 3/2002 | West .............................. 711/171 |
| 2004/0107419 A1* | 6/2004 | Blackmore et al. .......... 718/100 |
| 2009/0210635 A1* | 8/2009 | Blackmore et al. .......... 711/147 |

* cited by examiner

*Primary Examiner* — Than Nguyen

(57) ABSTRACT

Techniques for enabling secure cross-process memory sharing are provided. In one set of embodiments, a first user process executing on a computer system can create a memory handle representing a memory space of the first user process. The first user process can further define one or more access restrictions with respect to the memory handle. The first user process can then transmit the memory handle to a second user process executing on the computer system, the memory handle enabling the second user process to access at least a portion of the first process' memory space, subject to the one or more access restrictions.

21 Claims, 4 Drawing Sheets

SECURE CROSS-PROCESS MEMORY SHARING

BACKGROUND

In certain computing scenarios where multiple user processes access a shared storage volume, it may be desirable to implement an "arbitrator" user process that receives input/output (I/O) requests issued by the other user processes and executes the requests against the shared storage volume on behalf of those processes. For example, consider a scenario where the shared storage volume functions as a cache for data that is read and written by the user processes. In this case, the arbitrator process can track and prioritize the I/O requests received from the various user processes in order to, e.g., create/update cache mappings, implement cache eviction policies, and so on.

In a conventional I/O workflow involving a user process A and an arbitrator process B as described above, process A typically sends an I/O request (e.g., a read request) to process B, which forwards the read request to a kernel I/O stack that interfaces with the target storage volume. Upon execution of the read request at the storage tier, process B receives the read data from the kernel I/O stack and stores the data in a memory buffer that is local to (i.e., is in the memory space of) process B. Finally, process B notifies process A that the read request has been completed, and the read data is copied from the memory buffer in process B to another memory buffer that is local to process A for consumption by process A.

While the foregoing workflow is functional, it is also inefficient because it requires a copy of the read data intended for process A to be held, at least temporarily, in the memory space of process B. It is possible to work around this inefficiency by mapping a portion of process A's memory into process B via conventional memory mapping techniques. However, this can become impractical if process B needs to perform/arbitrate I/O on behalf of a large number of other processes. For example, process B may run out of memory address space before it is able to map shared memory segments for all such processes.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques for securely sharing memory across processes to facilitate asynchronous I/O and other functions. According to one set of embodiments, a first user process A executing on a computer system can create a memory handle for the purpose of sharing its memory space with a second user process B. As part of this handle creation step, process A can define (within a data structure pointed to by the memory handle) access restrictions that control which portions of its memory space will be accessible (i.e., shared) by process B via the memory handle, as well as whether those portions will be readable, writeable, or both readable and writable. Once created, process A can pass the memory handle to process B, thereby sharing its memory with process B.

In embodiments where process B is an arbitrator process configured to perform I/O against a storage volume on behalf of process A, process A can subsequently transmit an I/O request (directed to the storage volume) to process B. Upon receiving the I/O request, process B can forward the request, with the memory handle, to a kernel I/O stack. The kernel I/O stack can then execute the I/O request by interacting with the storage volume. As part of this request execution step, the kernel I/O stack can directly write I/O data to, or read I/O data from, the shared memory of process A using the memory handle forwarded by process B. For example, if the I/O request is a read request, the kernel I/O stack can use the memory handle to directly write the results of the read request (as received from the storage volume) into process A's shared memory. Alternatively, if the I/O request is a write request, the kernel I/O stack can use the memory handle to directly retrieve data to be written to the storage volume from process A's shared memory. Thus, with this approach, I/O requests originating from process A can pass through process B to the storage tier and the results of those requests can then be routed back to process A, without requiring duplicate buffers in process B or memory mapping between processes A and B.

These and other aspects of the present disclosure are described in further detail in the sections that follow.

2. Computer System

Figure 1:
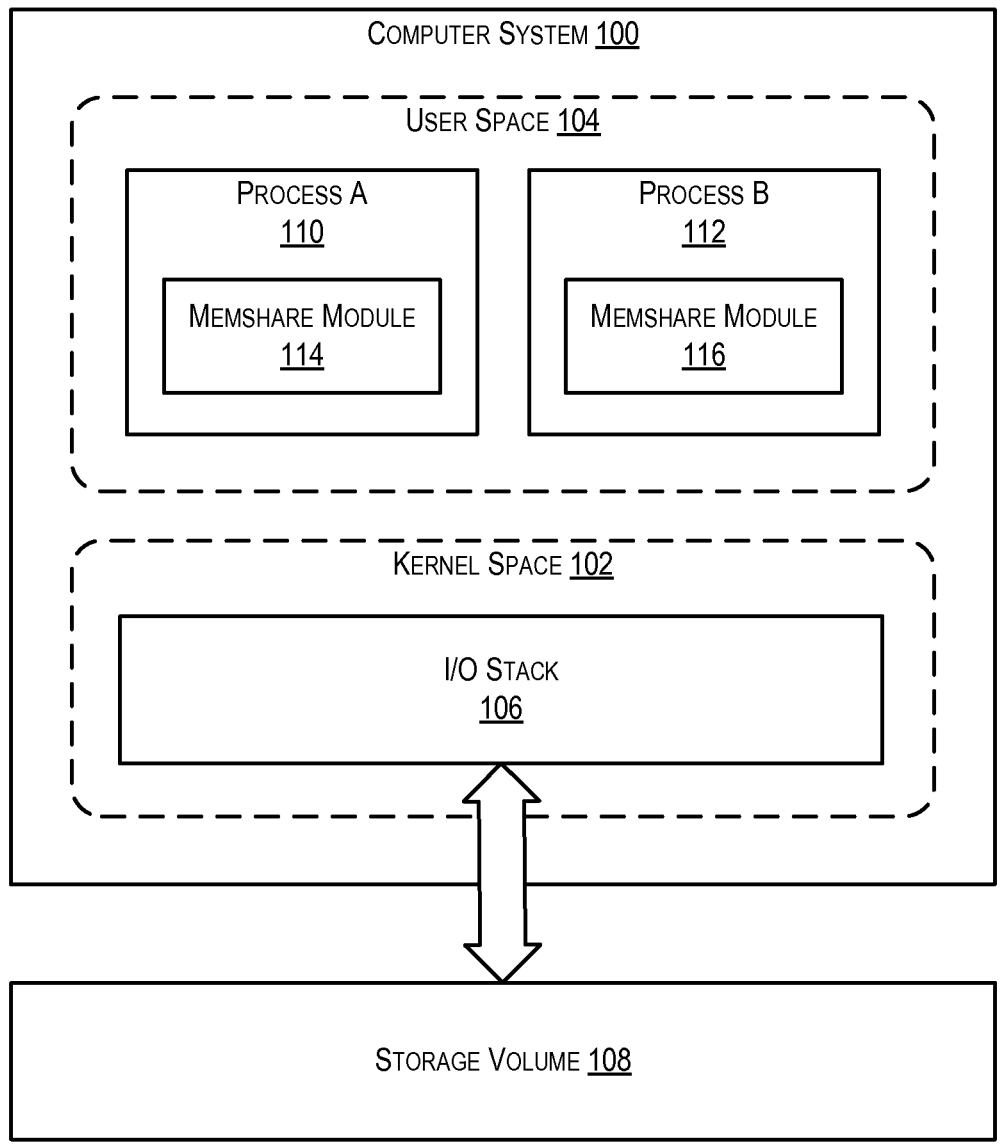
FIG. 1 depicts a computer system according to an embodiment.

FIG. 1 depicts a computer system 100 that supports secure cross-process memory sharing according to an embodiment. As shown, computer system 100 includes a software execution environment that is divided into a kernel space 102 and a user space 104. Kernel space 102 comprises software components that are part of a privileged operating system (OS) kernel of computer system 100. For instance, in FIG. 1, kernel space 102 includes an kernel-level I/O stack 106 that is configured to perform I/O with respect to a storage volume 108 communicatively coupled with computer system 100. Kernel space 102 can also include other components that are not specifically shown, such as a memory management subsystem, a process scheduling subsystem, privileged device drivers, and so on. In one embodiment, the OS kernel running on computer system 100 can be part of a conventional desktop OS, like Microsoft Windows, Mac OS, or Linux. In other embodiments, the OS kernel running on computer system 100 can be part of a native, or "bare metal," virtualization hypervisor, like VMware's ESX Hypervisor.

In contrast to kernel space 102, user space 104 comprises processes (referred to herein as "user processes") that run outside of the OS kernel. Examples of such user processes include application programs, shared libraries, virtual machines (VMs), and so on. In FIG. 1, two user processes A and B (reference numerals 110 and 112 respectively) are shown, although any number of such user processes may run concurrently.

Generally speaking, each user process in user space 104 is assigned its own memory space that is not directly accessible by other user processes. This feature, known as memory isolation, increases the stability and security of computer system 100, since a malicious or buggy user process cannot tamper with the memory (and/or other resources) owned by other user processes, or the OS itself. However, there may be certain scenarios where memory sharing across user processes is desirable.

For example, as mentioned in the Background section, consider a scenario where process B is an arbitrator process that initiates, via kernel I/O stack 106, I/O against storage volume 108 on behalf of process A (and potentially other user processes). In this case, it would be useful for process A to share a portion of its memory space with process B, so that process B does not need to maintain duplicate copies of I/O data that is returned by, or sent to, kernel I/O stack 106. Unfortunately, existing memory mapping techniques suffer from various limitations that make such memory sharing difficult, particularly if process B is configured to manage I/O on behalf of a large number of other user processes.

To address these limitations, process A and process B of FIG. 1 include novel memory sharing (memshare) modules 114 and 116 respectively. As described in further detail below, memshare modules 114 and 116 can interact in a manner that allows process A to grant, to process B, access to one or more predefined address ranges within the memory space of process A. This granting can be performed without requiring an explicit mapping of process A's memory into process B. Process B can then use the granted memory to perform, via kernel I/O stack 106, asynchronous I/O against storage volume 108, such that the I/O data read from/written to storage volume 108 is directly written to/read from the memory space of process A. This advantageously avoids the need for any duplicate I/O buffers in the memory space of process B.

It should be appreciated that FIG. 1 is illustrative and not intended to limit the embodiments disclosed herein. For example, the various entities shown in FIG. 1 may be arranged according to other configurations and/or may include subcomponents or functions that have not been specifically described. One of ordinary skill in the art will recognize many variations, modifications, and alternatives.

3. Memory Sharing Workflow

Figure 2:
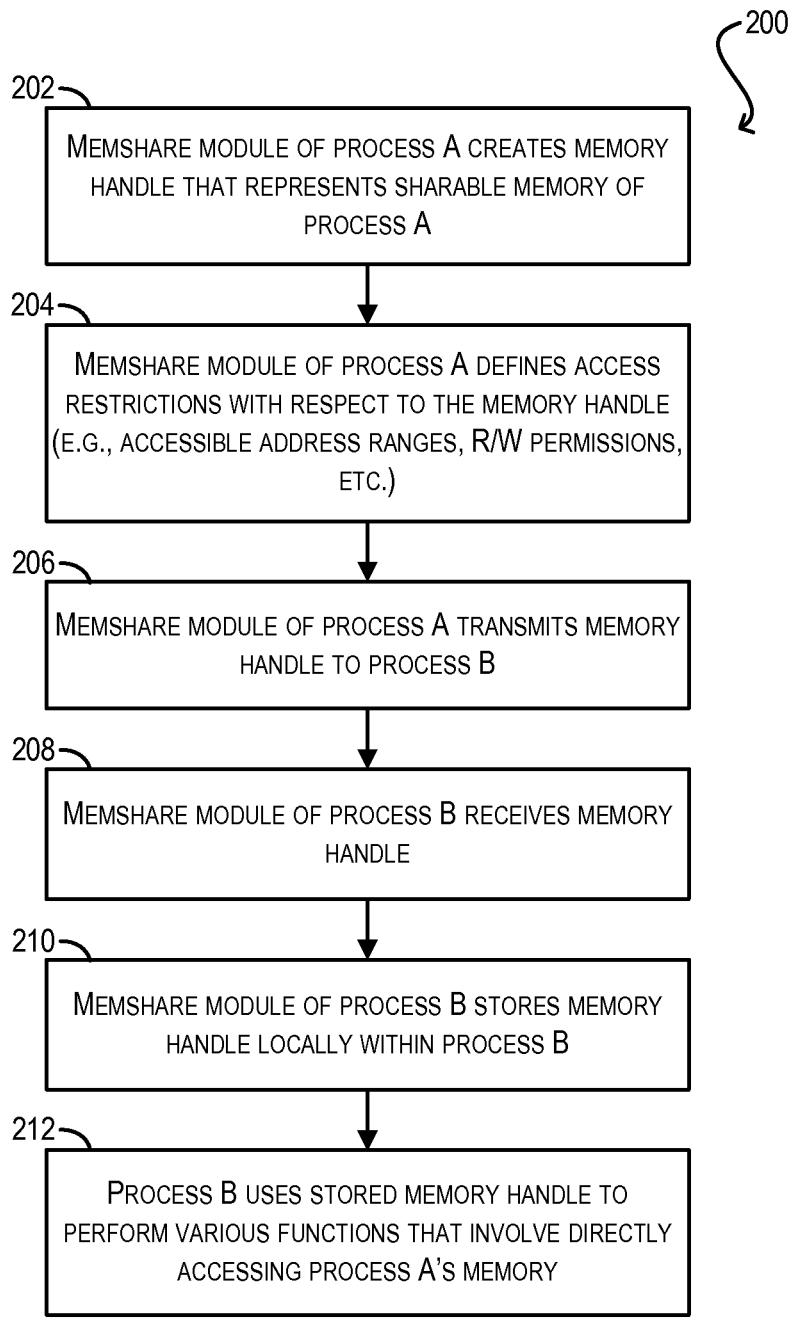
FIG. 2 depicts a workflow for enabling secure cross-process memory sharing according to an embodiment.

FIG. 2 depicts a high-level workflow 200 that may be carried out by memshare modules 114 and 116 of processes A and B to enable secure cross-process memory sharing according to an embodiment.

Starting with step 202, memshare module 114 of process A can create a memory handle for the purpose of sharing some (or all) of process A's memory with process B. In one embodiment, this memory handle can take the form of a file descriptor (FD), such as the file descriptors generally used in POSIX operating systems. In other embodiments, the memory handle can take the form of any other type of pointer, descriptor, or handle known in the art.

In a particular embodiment, the memory handle can point to a data structure that identifies process A (i.e., the process that created the handle), as well as a "whitelist" of one or more memory regions that may be shared via the handle. For example, the following code illustrates one possible representation of this data structure (referred to herein as a "crossfd"):

```
struct crossfd {
    process_id process;
    struct {
```

-continued

```
        uintptr_t start_addr;
        uint64_t length;
    } whitelist[ ];
}
```

In the example above, process_id is an identifier of the process that created the crossfd (e.g., process A), and whitelist[] is an array of whitelisted (i.e., sharable) memory regions of process A. Within each entry of whitelist[], start_addr identifies the starting address of a whitelisted memory region and length identifies the length of that whitelisted region. At the time of handle creation, whitelist[] may be configured by default to include the entire memory space of process A. Alternatively, whitelist[] may be configured by default to be empty (i.e., include no memory regions).

At step 204, memshare module 114 can define one or more access restrictions with respect to the memory handle created at step 202. For example, memshare module 114 can limit process B's access to one or more address ranges within process A's memory space. This can be performed by adding whitelisted memory regions to, or deleting/modifying existing whitelisted regions in, the whitelist array described above. In addition, memshare module 114 can specify whether the accessible address range is readable, writable, or both readable and writeable by process B. Thus, through step 204, memshare module 114 can ensure that process B will only be able to access the portions of process A's memory that it has explicitly authorized, and in the particular manner specified.

Once the memory handle and its access restrictions have been defined, memshare module 114 can transmit the handle to process B (step 206). This transmission can be performed via a socket connection between process A and process B, or via any other inter-process communication channel (e.g., shared memory, etc.).

At step 208, memshare module 116 of process B can receive the memory handle sent by memshare module 114 of process A. Memshare module 116 can store this information locally within process B, thereby recording the fact that process B has been granted access to process A's memory via the received memory handle (step 210). Finally, at step 212, process B can use the memory handle to perform various functions that require, or benefit from, direct access to process A's memory.

As noted previously, in certain embodiments, process B can be an arbitrator process that performs, via kernel I/O stack 106, I/O against storage volume 108 on behalf of process A. For example, process A may be an instance of an I/O filter, and process B maybe a filter daemon that performs I/O on behalf of filter instance A (as well as other instances of the same, or different, I/O filter(s)). In these embodiments, process B and kernel I/O stack 106 can execute process A's I/O in a manner that allows read/write data to be directly written to, or read from, the shared memory of process A (using the memory handle provided at step 206). Examples of these I/O workflows are described in the sections that follow.

4. Read Request Workflow

Figure 3:
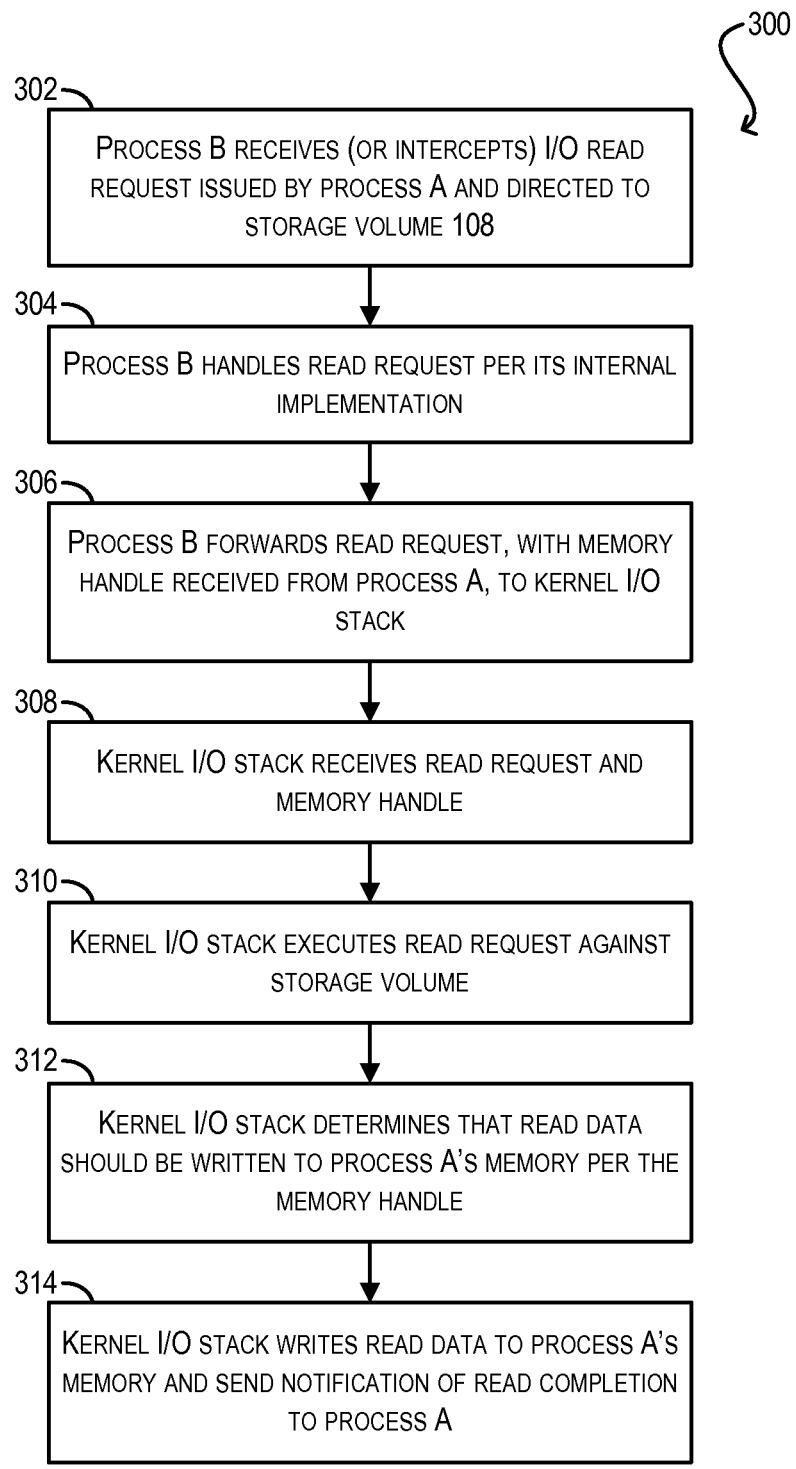
FIG. 3 depicts an I/O read request workflow that takes advantage of the secure cross-process memory sharing enabled by FIG. 2 according to an embodiment.

FIG. 3 depicts a workflow 300 that can be performed process B and kernel I/O stack 106 of FIG. 1 for more efficiently handling I/O read requests originating from process A according to an embodiment. Workflow 300 assumes that process A has shared a portion of its memory space with process B by granting a memory handle per workflow 200 of FIG. 2.

Starting with step 302, process B can receive (or intercept) an I/O read request issued by process A and directed to a storage object on storage volume 108. At step 304, process B can handle the read request as needed for its own purposes (e.g., internal bookkeeping, arbitration, etc.). Process B can then forward the read request to kernel I/O stack 106 for execution against storage volume 108 (step 306). As part of forwarding the read request at block 306, process B can also send to kernel I/O stack 106 the memory handle received from process A as the buffer target for the request. In this way, process B can ensure that that the results of the request will be passed back to process A, rather than to process B.

At steps 308 and 310, kernel I/O stack 106 can receive the read request and memory handle from process B and can interact with storage volume 108 to execute the request (i.e., retrieve the requested read data from storage volume 108). Upon retrieving the read data, kernel I/O stack 106 can determine that the read data should be written into a sharable portion of process A's memory as identified by the memory handle (and included whitelist regions) received from process B (step 312). As part of this step, kernel I/O stack 106 can verify that this memory portion is writable per its associated permissions.

Finally, at step 314, kernel I/O stack 106 can write the read data into process A's shared memory and can transmit a notification (e.g., a system event) to process A indicating that the read request has been completed. This notification can include, e.g., the memory offset(s) where the read data can be found. Process A can then consume the read data and issue additional I/O requests as needed (not shown), which may cause workflow 300 to be repeated. Note that since kernel I/O stack 106 writes the read data directly into process A's memory at step 314, there is no need to maintain a duplicate buffer copy in the memory space of process B.

It should be appreciated that workflow 300 is illustrative and various modifications are possible. For example, while workflow 300 indicates that kernel I/O stack 106 sends a "read request complete" notification directly to process A, in some embodiments kernel I/O stack 106 can send this notification to process B. This may be useful if, e.g., process B's implementation requires that it keep track of such request completions (or failures). In these embodiments, upon receiving the "read request complete" notification, process B can forward the notification to process A.

Further, although a specific sequence of steps is shown in workflow 300, other sequences of steps may be performed in other embodiments. For example, steps described as sequential can be executed in parallel, order of steps can be varied, and steps may be modified, combined, added, or omitted. One of ordinary skill in the art will recognize many variations, modifications, and alternatives.

5. Write Request Workflow

Figure 4:
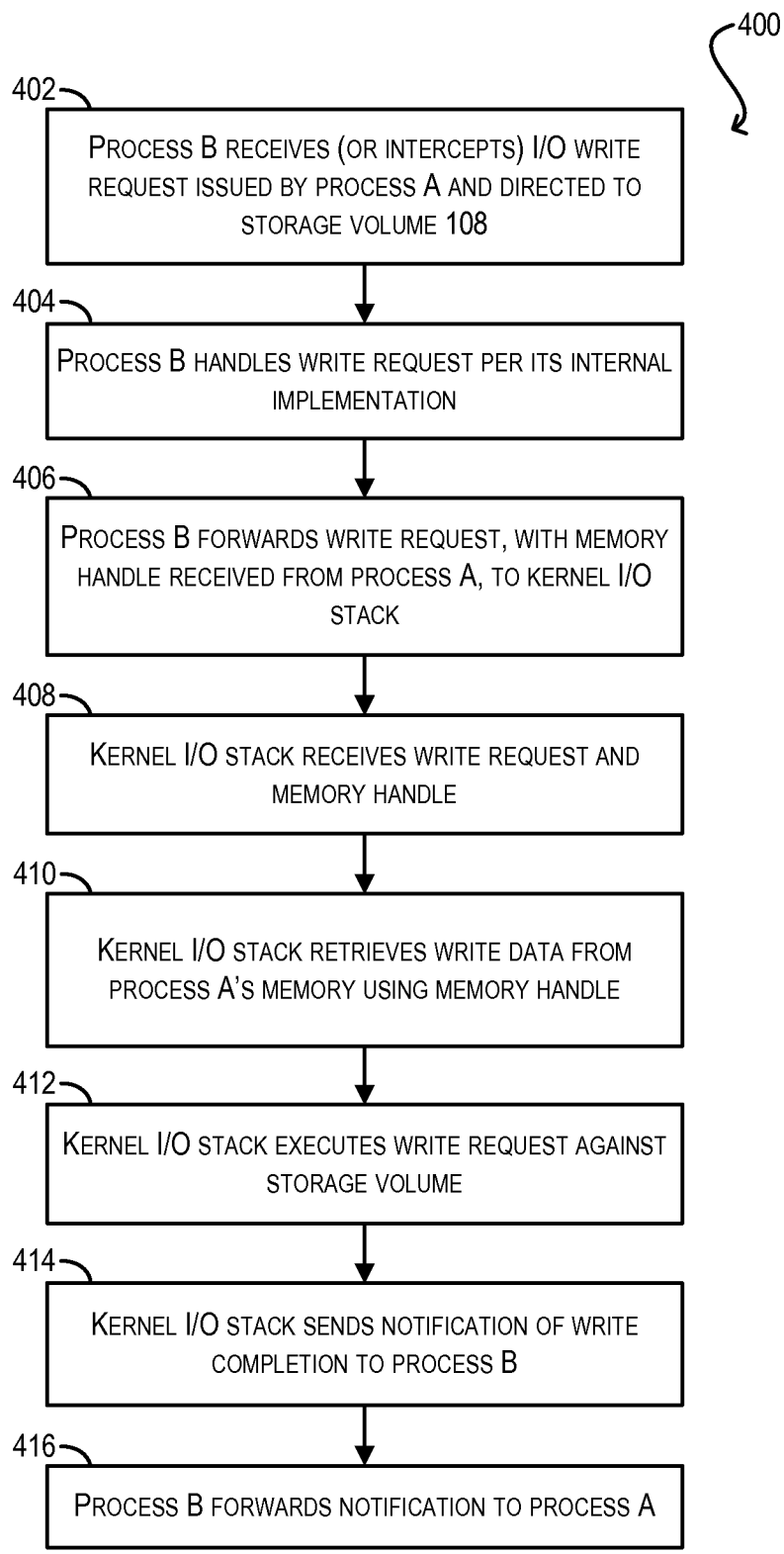
FIG. 4 depicts an I/O write request workflow that takes advantage of the secure cross-process memory sharing enabled by FIG. 2 according to an embodiment.

FIG. 4 depicts a workflow 400 that can be performed process B and kernel I/O stack 106 of FIG. 1 for more efficiently handling I/O write requests originating from process A according to an embodiment. Like workflow 300, workflow 400 assumes that process A has shared a portion of its memory space with process B by granting a memory handle per workflow 200 of FIG. 2.

Starting with step 402, process B can receive (or intercept) an I/O write request issued by process A and directed to a storage object on storage volume 108. At step 404, process B can handle the write request as needed for its own purposes (e.g., internal bookkeeping, arbitration, etc.). Process B can then forward the write request to kernel I/O stack 106 for execution against storage volume 108 (step 406). As part of forwarding the write request at block 406, process B can also send to kernel I/O stack 106 the memory handle received from process A. In this write workflow, the whitelisted memory regions included in the data structure pointed to by the memory handle can identify the offset(s) in process A's memory where the data to be written to storage volume 108 (i.e., the write data) is located.

At step 408, kernel I/O stack 106 can receive the write request and memory handle from process B. Kernel I/O stack 106 can then retrieve the write data from process A's shared memory using the memory handle, and can interact with storage volume 108 to execute the write request (i.e., commit the write data to storage volume 108) (steps 410 and 412).

Upon successful completion of the write request, kernel I/O stack 106 can send a "write request completion" notification to process B (step 414). Finally, process B can forward the notification to process A and the workflow can end (step 416).

It should be appreciated that workflow 400 is illustrative and various modifications are possible. For example, while workflow 400 indicates that kernel I/O stack 106 sends a "write request complete" notification to process B (which then forwards the notification to process A), in some embodiments stack 106 can send this notification directly to process A. This may be useful if, e.g., process B has no need to track write completions (or failures).

Further, although a specific sequence of steps is shown in workflow 400, other sequences of steps may be performed in other embodiments. For example, steps described as sequential can be executed in parallel, order of steps can be varied, and steps may be modified, combined, added, or omitted. One of ordinary skill in the art will recognize many variations, modifications, and alternatives.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for enabling secure cross-process memory sharing, the method comprising:
   creating, by a first user process executing on a computer system, a memory handle representing a memory space of the first user process;
   defining, by the first user process, one or more access restrictions with respect to the memory handle;
   transmitting, by the first user process, the memory handle to a second user process executing on the computer system, the memory handle enabling the second user process to access at least a portion of the first process' memory space through the memory handle, subject to the one or more access restrictions, without extending the memory address space of the first process or the memory space of the second process to include shared memory;
   transmitting, the by the first process, an input/output (I/O) request, directed to a storage volume;
   intercepting the I/O request by the second user process before the request reaches the storage volume; and
   performing, by the second user process, the I/O request on behalf of the first user process wherein the data that is associated with the I/O operation is transmitted through the memory handle directly between the storage volume and the first process' memory space.

2. The method of claim 1 wherein the one or more access restrictions include an address range within the memory space of the first user process that may be accessed by the second user process.

3. The method of claim 2 wherein the one or more access restrictions further include an indication of whether the address range is readable, writeable, or both readable and writable by the second user process.

4. The method of claim 1 wherein the one or more access restrictions are stored in a data structure pointed to by the memory handle.

5. The method of claim 1 wherein the memory handle is a file descriptor.

6. The method of claim 1 wherein performing the I/O request directed to the storage volume further comprises:
   receiving, by the second user process, an I/O read request originating from the first user process;
   forwarding, by the second user process to a kernel I/O stack of the computer system, the I/O read request and the memory handle;
   receiving, by the kernel I/O stack, read data for the I/O read request from the storage volume; and
   directly writing, by the kernel I/O stack, the read data into the memory space of the first process using the memory handle.

7. The method of claim 1 wherein performing the I/O request directed to the storage volume further comprises:
   receiving, by the second user process, an I/O write request originating from the first user process;
   forwarding, by the second user process to a kernel I/O stack of the computer system, the I/O write request and the memory handle;
   retrieving, by the kernel I/O stack, write data for the I/O write request from the memory space of the first process using the memory handle; and
   causing, by the kernel I/O stack, the write data to be written to the storage volume.

8. A non-transitory computer readable storage medium having stored thereon program code executable by computer system, the program code embodying a method for enabling secure cross-process memory sharing, the method comprising:
   creating, by a first user process executing on the computer system, a memory handle representing a memory space of the first user process;
   defining, by the first user process, one or more access restrictions with respect to the memory handle; and transmitting, by the first user process, the memory handle to a second user process executing on the computer system, the memory handle enabling the second user process to access at least a portion of the first process' memory space through the memory handle, subject to the one or more access restrictions, without extending the memory address space of the first process or the memory space of the second process to include shared memory;

transmitting, the by the first process, an input/output (I/O) request, directed to a storage volume;

intercepting the I/O request by the second user process before the request reaches the storage volume; and performing, by the second user process, the I/O request on behalf of the first user process wherein the data that is associated with the I/O operation is transmitted through the memory handle directly between the storage volume and the first process' memory space.

9. The non-transitory computer readable storage medium of claim 8 wherein the one or more access restrictions include an address range within the memory space of the first user process that may be accessed by the second user process.

10. The non-transitory computer readable storage medium of claim 9 wherein the one or more access restrictions further include an indication of whether the address range is readable, writeable, or both readable and writable by the second user process.

11. The non-transitory computer readable storage medium of claim 8 wherein the one or more access restrictions are stored in a data structure pointed to by the memory handle.

12. The non-transitory computer readable storage medium of claim 8 wherein the memory handle is a file descriptor.

13. The non-transitory computer readable storage medium of claim 8 wherein performing the I/O request directed to the storage volume further comprises:
  receiving, by the second user process, an I/O read request originating from the first user process;
  forwarding, by the second user process to a kernel I/O stack of the computer system, the I/O read request and the memory handle;
  receiving, by the kernel I/O stack, read data for the I/O read request from the storage volume; and
  directly writing, by the kernel I/O stack, the read data into the memory space of the first process using the memory handle.

14. The non-transitory computer readable storage medium of claim 8 wherein performing the I/O request directed to the storage volume further comprises:
  receiving, by the second user process, an I/O write request originating from the first user process;
  forwarding, by the second user process to a kernel I/O stack of the computer system, the I/O write request and the memory handle;
  retrieving, by the kernel I/O stack, write data for the I/O write request from the memory space of the first process using the memory handle; and
  causing, by the kernel I/O stack, the write data to be written to the storage volume.

15. A computer system comprising:
a processor; and
first and second user processes running on the processor, wherein the first and second user processes are configured to:
  create a memory handle representing a memory space of the first user process;
  define one or more access restrictions with respect to the memory handle;
  transmit the memory handle to the second user process, the memory handle enabling the second user process to access at least a portion of the first process' space through the memory handle, subject to the one or more access restrictions, without extending the memory address space of the first process or the memory space of the second process to include shared memory
  transmit, the by the first process, an input/output (I/O) request, directed to a storage volume;
  intercept the I/O request by the second user process before the request reaches the storage volume; and
  perform, by the second user process, the I/O request on behalf of the first user process wherein the data that is associated with the I/O operation is transmitted through the memory handle directly between the storage volume and the first process' memory space.

16. The computer system of claim 15 wherein the one or more access restrictions include an address range within the memory space of the first user process that may be accessed by the second user process.

17. The computer system of claim 16 wherein the one or more access restrictions further include an indication of whether the address range is readable, writeable, or both readable and writable by the second user process.

18. The computer system of claim 15 wherein the one or more access restrictions are stored in a data structure pointed to by the memory handle.

19. The computer system of claim 15 wherein the memory handle is a file descriptor.

20. The computer system of claim 15 wherein the second user process performs I/O against a storage volume on behalf of the first user process,
  wherein the second user process is configured to perform the I/O request directed to the storage by:
    receiving an I/O read request originating from the first user process; and
    forwarding, to a kernel I/O stack of the computer system, the I/O read request and the memory handle; and
  wherein the kernel I/O stack is configured to:
    receive read data for the I/O read request from the storage volume; and
    directly write the read data into the memory space of the first process using the memory handle.

21. The computer system of claim 15 wherein the second user process performs I/O against a storage volume on behalf of the first user process,
  wherein the second user process is configured to perform the I/O request directed to the storage by:
    receiving an I/O write request originating from the first user process; and
    forwarding, to a kernel I/O stack of the computer system, the I/O write request and the memory handle; and
  wherein the kernel I/O stack is configured to:
    retrieve write data for the I/O write request from the memory space of the first process using the memory handle; and
    cause the write data to be written to the storage volume.

* * * * *